(No Model.)
D. EISOLT.
EXTENSION CHAMFER KNIFE.
No. 351,586.  Patented Oct. 26, 1886.
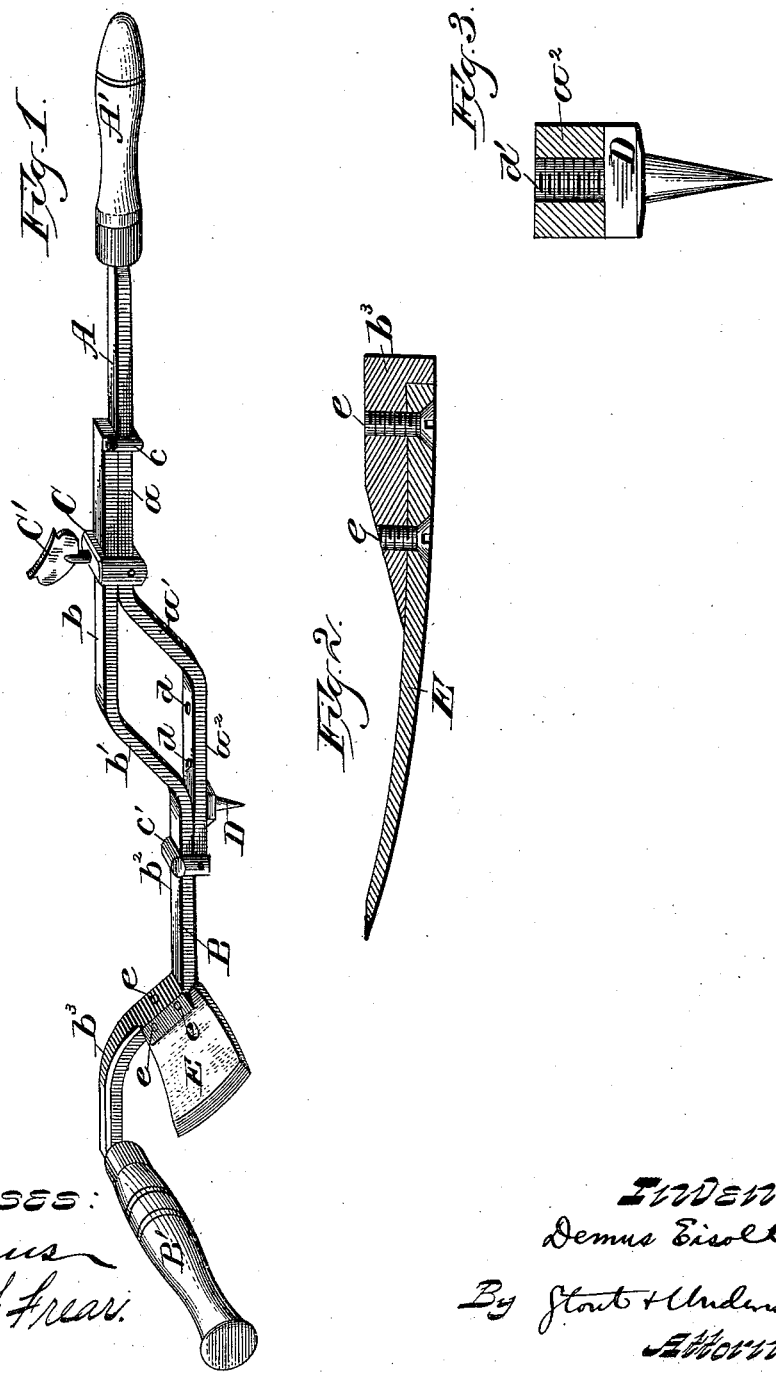
Witnesses:
E. G. Asmus
Maurice F. Frear
Inventor:
Demus Eisolt
By Stout & Underwood
Attorneys.

UNITED STATES PATENT OFFICE.

DEMUS EISOLT, OF MILWAUKEE, WISCONSIN.

EXTENSION CHAMFER-KNIFE.

SPECIFICATION forming part of Letters Patent No. 351,586, dated October 26, 1886.

Application filed May 18, 1886. Serial No. 202,497. (No model.)

*To all whom it may concern:*

Be it known that I, DEMUS EISOLT, of Milwaukee, in the county of Milwaukee and State of Wisconsin, have invented certain new and useful Improvements in Extension Chamfer-Knives; and I do hereby declare that the following is a full, clear, and exact description thereof.

My invention relates to implements for chamfering kegs or barrels; and it consists in a hand-tool made extensible and adjustable to the required length, as will be more fully set forth hereinafter.

In the drawings, Figure 1 is a perspective view of my said tool extended, and Figs. 2 and 3 are details.

My device consists, primarily, of two parts, A and B, the former consisting of the straight parts $a$ and $a^2$, united by the oblique bent part $a'$, all cast or otherwise solidly formed in one piece, while the part B consists of the similarly-bent parts $b$ $b'$ $b^2$, exactly corresponding to the part A, so as to slide thereon, and having, in addition, the upwardly-extended part $b^3$, terminating in a shank at right angles to its length to receive the handle B', while the handle A' of the part A is driven on the shank of said part in the direction of its length. At the end of the part B nearest the handle of A is a downwardly-projecting loop, $c$, secured to B to receive A, while at the opposite end of A there is an upwardly-projecting loop, $c'$, secured thereto to receive B. C is another loop, secured to the portion $a$ of the part A adjacent to its bent portion $a'$, and receiving also the portion $b$ of the part B. This loop has a screw-threaded perforation on top to receive a set-screw, C', whereby the parts A and B may be held rigidly together after receiving the desired adjustment.

My device is designed to chamfer the barrel or keg after it is headed, and in operation the pivot-screw D is pressed into the barrel or keg head after the desired adjustment of the parts A and B has been secured, and the tool used after the ordinary manner of a common non-extensible chamfer-knife. In order to secure still further adjustment the portion $a^2$ of the part A is provided with a series of screw-threaded perforations, $d$ $d$, and the screw-threaded end $d'$ of the pivot-screw D is screwed into either one of them in accordance with the adjustment desired. In this manner my tool is applicable to any size of keg or barrel, from eighths to whole barrels, and thus takes the place of a set or series of the old-style chamfer-knives.

E is the blade of my tool, which is made removable, and secured by screws $e$ $e$ to the suitably recessed or shouldered portion $b^3$ of the part B.

I propose to supply a series of removable blades, E, with each tool, if desired, so that different bevels or chamfers may be given to the barrels or kegs, as required, the rest of the tool being the same. Besides this, the blade can be easily removed—as for grinding—or if broken can be readily replaced at small cost, the parts A and B being thereby utilized without extra expense.

Having thus described my invention, what I claim as new, and desire to secure by Letters Patent, is—

1. In a hand-tool for chamfering barrels, kegs, &c., the combination of two extensible parts, one sliding upon the other, one of them carrying the blade, and both having handles, and a set-screw for holding the two parts rigidly in contact at any desired degree of extension, substantially as set forth.

2. In a hand-tool for chamfering barrels, kegs, &c., the combination of two extensible parts, one sliding upon the other, each consisting of two horizontal portions, at different levels united by integral oblique central portions, one part carrying a blade, and both having suitable handles, and the end of each extensible part farthest from its handle being provided with a loop to receive the other extensible part, with another loop secured to one part adjacent to the described oblique portion thereof and passing around the other part, and a set-screw passing through said loop and adapted to bear against the said other extensible part, substantially as set forth.

3. In a hand-tool for chamfering barrels, kegs, &c., the combination of two extensible parts, one sliding upon the other, and connected together by loops, one of said parts carrying the blade, and the other provided with a series of pivot-seats, and both provided with suitable handles, with a securing device for holding the two extensible parts rigidly in contact at any desired point, and a movable pivot adapted to be secured to either of the said seats, substantially as set forth.

In testimony that I claim the foregoing I have hereunto set my hand, at Milwaukee, in the county of Milwaukee and State of Wisconsin, in the presence of two witnesses.

DEMUS EISOLT.

Witnesses:
H. G. UNDERWOOD,
N. E. OLIPHANT.